United States Patent [19]

Laible et al.

[11] 4,099,726
[45] Jul. 11, 1978

[54] PACKING FOR CRYOGENIC SEAL JOINT

[75] Inventors: Roy C. Laible, Jamaica Plain; Ari Brynjolfsson, Wayland, both of Mass.

[73] Assignee: The United States of America as represented by the Secretary of the Army, Washington, D.C.

[21] Appl. No.: 831,452

[22] Filed: Sep. 8, 1977

[51] Int. Cl.² .................. F16J 15/10; F17C 7/02; B32B 27/34
[52] U.S. Cl. .................. 277/1; 277/DIG. 6; 62/55; 252/62; 285/DIG. 5; 428/458; 428/474
[58] Field of Search .............. 277/1, DIG. 6, 230; 62/55; 285/DIG. 5, DIG. 11; 428/458, 474; 252/62

[56] References Cited

U.S. PATENT DOCUMENTS

| | | | |
|---|---|---|---|
| 2,971,782 | 2/1961 | Sparkman et al. | 285/DIG. 5 |
| 3,397,720 | 8/1968 | Jones | 62/55 X |
| 3,767,211 | 10/1973 | Amphlett | 277/DIG. 6 X |
| 3,795,245 | 3/1974 | Allen et al. | 62/55 X |
| 3,831,259 | 8/1974 | Joulas | 277/DIG. 6 X |
| 3,937,754 | 2/1976 | Shimotsuma et al. | 252/62 X |
| 3,988,029 | 10/1976 | Gibson | 285/DIG. 5 X |

FOREIGN PATENT DOCUMENTS 13,393  3/1934  Australia ................................. 62/55

OTHER PUBLICATIONS

*Advances in Cryogenic Engineering*, vol. 7, pp. 556–561, "Temperature-Energized Static Seal for Liquid Oxygen," S. E. Logan, Jul. 1955.

*Primary Examiner*—Robert S. Ward, Jr.
*Attorney, Agent, or Firm*—Nathan Edelberg; Robert P. Gibson; Charles C. Rainey

[57] ABSTRACT

Method for preventing the escape of liquid nitrogen and nitrogen gas from an apparatus for treating materials with high energy ionizing radiation while the materials are being maintained at temperatures below about −40° C. with liquid nitrogen comprising using a packing made of filaments of poly (p-phenylene terephthalamide) at the joints in the liquid nitrogen conduit.

8 Claims, 2 Drawing Figures

PACKING FOR CRYOGENIC SEAL JOINT

The invention described herein may be manufactured, used, and licensed by or for the Government for governmental purposes without the payment to us of any royalty thereon.

BACKGROUND OF THE INVENTION

This invention relates to a method of preventing the escape of liquid nitrogen and nitrogen gas from an apparatus for treating materials with high energy ionizing radiation while the materials are being maintained at temperatures below about −40° C. with liquid nitrogen. Conventional packing materials used to seal certain joints in pipelines conducting liquid nitrogen into an apparatus in which materials have been exposed to high energy ionizing radiation at low temperatures, such as below −40° C., have deteriorated very rapidly under the combination effects of high energy ionizing radiation and low temperatures. Such packings have required frequent replacement, thus increasing labor as well as material costs.

It is an object of the present invention to provide a method of preventing the escape of liquid nitrogen and nitrogen gas from an apparatus for treating materials with high energy ionizing radiaton while the materials are being maintained at temperatures below about −40° C. with liquid nitrogen.

It is another object of the invention to provide packing for connectible and disconnectible joints in conduits for liquid nitrogen being used to maintain a low temperature within an apparatus in which materials are exposed to high energy ionizing radiation while being maintained at the low temperature.

Other objects and advantages will become apparent from the following description of the invention.

SUMMARY OF THE INVENTION

Method of preventing the escape of liquid nitrogen and nitrogen gas from an apparatus for treating materials with high energy ionizing radiation while the materials are being maintained at temperatures below about −40° C. with liquid nitrogen, comprising packing each connectible and disconnectible joint in the conduit which conducts liquid nitrogen to the apparatus with a packing element made of filaments of poly (p-phenylene terephthalamide).

DESCRIPTION OF THE PREFERRED EMBODIMENT

Figure 1:
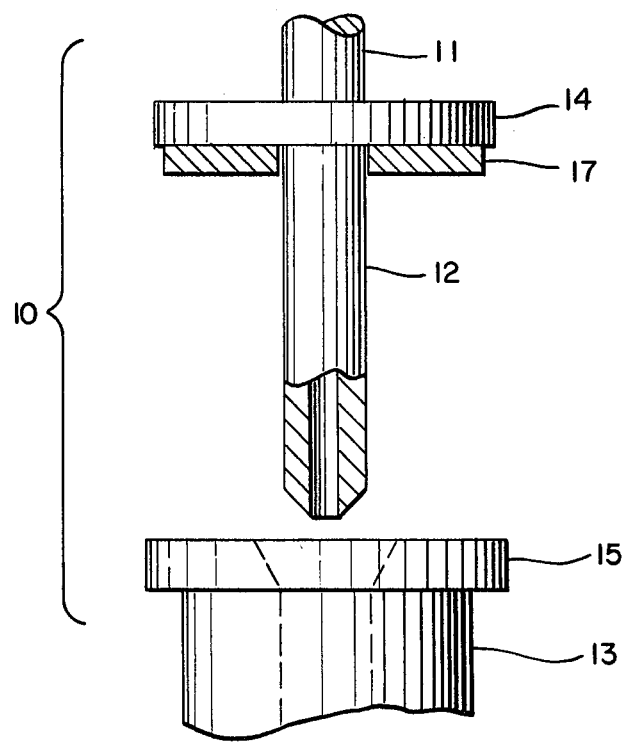

The invention will become apparent from the following description of one embodiment thereof taken in conjunction with the accompanying drawings, in which:

FIG. 1 is an exploded view in elevation of a connectible and disconnectible joint in a conduit for conducting liquid nitrogen into an apparatus for treating materials with high energy ionizing radiation while the materials are being maintained at temperatures below about −40° C., the nozzle being connected to a source of liquid nitrogen (not shown) and being shown prior to connection thereof with the conduit which leads into the apparatus (not shown) in which the materials are treated with high energy ionizing radiation.

Figure 2:
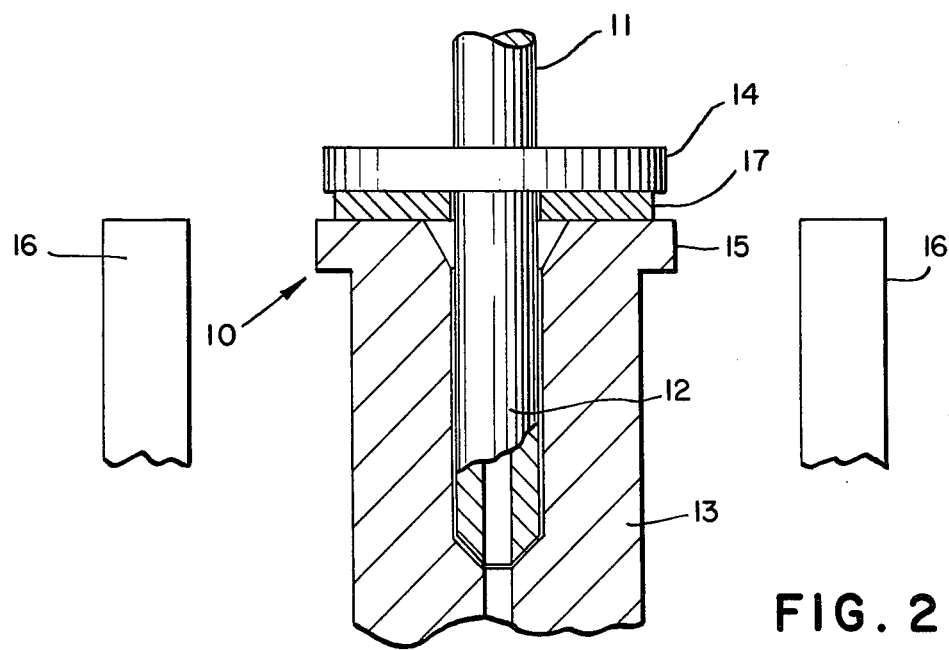

FIG. 2 is a view similar to FIG. 1 of the joint in a conduit for conducting liquid nitrogen into the apparatus, but with the nozzle connected to the conduit which leads into the apparatus, showing the packing element forming a tight joint from which liquid nitrogen and nitrogen gas do not leak during treatment of the materials with high energy ionizing radiation while being maintained at temperatures below about −40° C. by the liquid nitrogen.

In the embodiment of the invention shown in the drawings, reference numeral 10 represents a connectible and disconnectible joint in the main conduit from a liquid nitrogen supply into an apparatus used for treating various types of materials with high energy ionizing radiation. A first conduit 11, which is connected to a liquid nitrogen source (not shown), ends in a nozzle 12 which is designed to mate with second conduit 13, which leads into an apparatus (not shown) in which materials in various types of packages are treated with high energy ionizing radiation at temperatures below about −40° C., such temperatures being maintained by the flow of liquid nitrogen, the boiling point of which is −195.8° C., into the apparatus holding the containers of materials being irradiated. In order to prevent leakage of liquid nitrogen and nitrogen gas at the joint, a first flange 14 is welded on first conduit 11 and a second flange 15 is welded on second conduit 13 or formed thereon in a casting operation, and a packing 17 or gasket is fitted over nozzle 12 and is held tightly between first flange 14 and second flange 15 when nozzle 12 mates with second conduit 13. Packing 17 is preferably made of a needle-punched felt of filaments of poly (p-phenylene terephthalamide) tightly packed so as to produce a gas-tight seal between first and second flanges 14 and 15 when hydraulic pressure is used to urge first conduit 11 toward second conduit 13, which is firmly fixed in place on the apparatus (not shown) in which the irradiation of the materials is carried out. The irradiation of the materials is conducted between a spaced apart pair of plaques 16, each containing a plurality of Cobalt-60 strips mounted in a series of modules so that the materials are exposed to a predetermined number of rads per minute. At the same time the packing 17 in the joint 10 is exposed to a similar amount of high energy ionizing radiation while it is at temperatures at times as low as −195.8° C.

Needle-punched felt packing such as that described above, weighing 8 ounces per square yard and being 0.25 inch thick, has withstood exposure to at least 306 megarads of high energy ionizing radiation from a 3-megacurie Cobalt-60 source without disintegrating or allowing any detectable leakage of liquid or gaseous nitrogen at a joint, such as that illustrated in the drawings; whereas, packings of the same general physical construction, but made of other commonly used packing materials, such as elastomeric compounds, plastic foam, and asbestos have been found to crumble after exposure to 10–100 megarads of high energy ionizing radiation at temperatures below −40° C. The crumbling of such materials is apparently caused by excessively high degrees of cross-linking of the high polymers brought about by the combination of large amounts of high energy ionizing radiation and the simultaneous effects of exposure of the materials to extremely low temperatures, such as temperatures below about −40° C. down to as low as the boiling point of liquid nitrogen, i.e. −195.8° C. When materials are required to be exposed to such conditions repeatedly over a long period of time, it has been very difficult to produce packings for joints which would stand up for an appreciable length of time under such severe conditions.

Other forms of poly (p-phenylene terephthalamide), such as woven fabrics, may be used for packings or gaskets for joints in pipelines conducting liquid nitrogen which are exposed to high energy ionizing radiation, such packings having exposure lives of in excess of one thousand megarads with comparatively little loss in tensile strength. Such a packing made from a plurality of layers of woven poly (p-phenylene terephthalamide) fabric, particularly using three layers of such fabric weighing at least 13 oz/yd$^2$, after exposure to 1000 megarads of ionizing radiation from a linear accelerator having an energy of 10 MEV at 7 kilowatts average power while liquid nitrogen was being conducted through a connectible and disconnectible joint in a conduit containing this packing, was found to have lost less than 30 percent of its tensile strength in the warp yarns and a negligible amount of tensile strength in the filling yarns. The warp yarns still retained average tensile strengths of 12.6 grams per denier, which is appreciably higher than that of other conventionally used textile yarns prior to any exposure to ionizing radiation at temperatures below −40° C.

The packings made of poly (p-phenylene terephthalamide) for the purposes of the present invention, whether in the form of compacted felt or in the form of woven fabric, must be sufficiently thick and dense to provide a gas-tight seal when placed under hydraulic or other pressure applied to the flanges of the joint. The thickness and density required will depend on numerous factors relative to the dimensions of the joint, the pressure of the nitrogen as it passes through the joint, and the sizes of the filaments used in preparation of the felts or fabrics.

The poly (p-phenylene terephthalamide) of which the filaments employed in the felts or fabrics in accordance with the invention are made is an aromatic polyamide produced by condensation polymerization of aromatic diamines, e.g., paraphenylene diamine, with aromatic dicarboxylic acids, e.g., terephthalic acid, or derivatives of such diamines and dicarboxylic acids which react to produce polyamides. The preferred poly (p-phenylene terephthalamide) for use in the present invention is manufactured and sold under the tradename, "Kevlar", by E. I. du Pont de Nemours & Co. The exact structure and chemical composition of "Kevlar" is not known to applicants. It is thought by some authors to be obtained by the polymerization of paraphenylene diamine or a derivative thereof with terephthalic acid or a derivative thereof, the product being designated as poly (1, 4 phenylene terephthalamide) or poly (p-phenylene terephthalamide). (See G. S. Fielding-Russell, Text. Res. J., 41, 861 (1971) and W. B. Black, J. Macromol. Sci. Chem. A7, 3ff (1973).

It is apparent that an excellent method of preventing leakage of liquid and gaseous nitrogen from joints in conduits for liquid nitrogen which are exposed to high dosages of ionizing radiation has been provided by the present invention wherein packings for such joints are made of poly (p-phenylene terephthalamide) filaments.

It will be understood that various changes in the details, materials, and process conditions which have been herein described and illustrated in order to explain the nature of the invention, may be made by those skilled in the art within the principle and scope of the invention.

We claim:

1. A method of preventing the escape of liquid nitrogen and nitrogen gas from an apparatus for treating materials with high energy ionizing radiation while said materials are being maintained at temperatures below about −40° C. with liquid nitrogen, which comprises packing each connectible and disconnectible joint of said apparatus through which said liquid nitrogen is conducted with a packing element consisting essentially of filaments of poly (p-phenylene terephthalamide).

2. Method according to claim 1, wherein said packing element is a needle-punched felt.

3. Method according to claim 1, wherein said packing element comprises a plurality of layers of fabric prepared from yarns of poly (p-phenylene terephthalamide).

4. Method according to claim 3, wherein said fabric is a woven fabric.

5. Method according to claim 2, wherein said needle-punched felt contains a sufficient amount of said filaments of poly (p-phenylene terephthalamide) to produce a gas-tight seal at said joint.

6. Method according to claim 4, wherein said woven fabric contains a sufficient amount of said filaments of poly (p-phenylene terephthalamide) to produce a gas-tight seal at said joint.

7. Method according to claim 2, wherein said needle-punched felt is at least 0.25 inch thick and weighs at least 8 ounces per square yard.

8. Method according to claim 3, wherein said fabric weighs at least 13 ounces per square yard and said packing element comprises at least three layers of said fabric.

* * * * *